(No Model.)

F. S. CARR.
MACHINE FOR UPSETTING TIRES.

No. 252,865. Patented Jan. 31, 1882.

Witnesses:
N. C. McArthur
Wm. B. Bond

Inventor
Fred S. Carr,
per Chas. H. Fowler,
Attorney.

United States Patent Office.

FRED SUMNER CARR, OF WEST NEWBURY, MASSACHUSETTS.

MACHINE FOR UPSETTING TIRES.

SPECIFICATION forming part of Letters Patent No. 252,865, dated January 31, 1882.

Application filed July 9, 1881. (No model.)

*To all whom it may concern:*

Be it known that I, FRED SUMNER CARR, a citizen of the United States, residing at West Newbury, in the county of Essex and State of Massachusetts, have invented certain new and useful Improvements in Tire-Upsetters; and I do hereby declare that the following is a full, clear, and exact description of the same, reference being had to the annexed drawings, making a part of this specification, and to the letters and figures of reference marked thereon.

Figure 1:
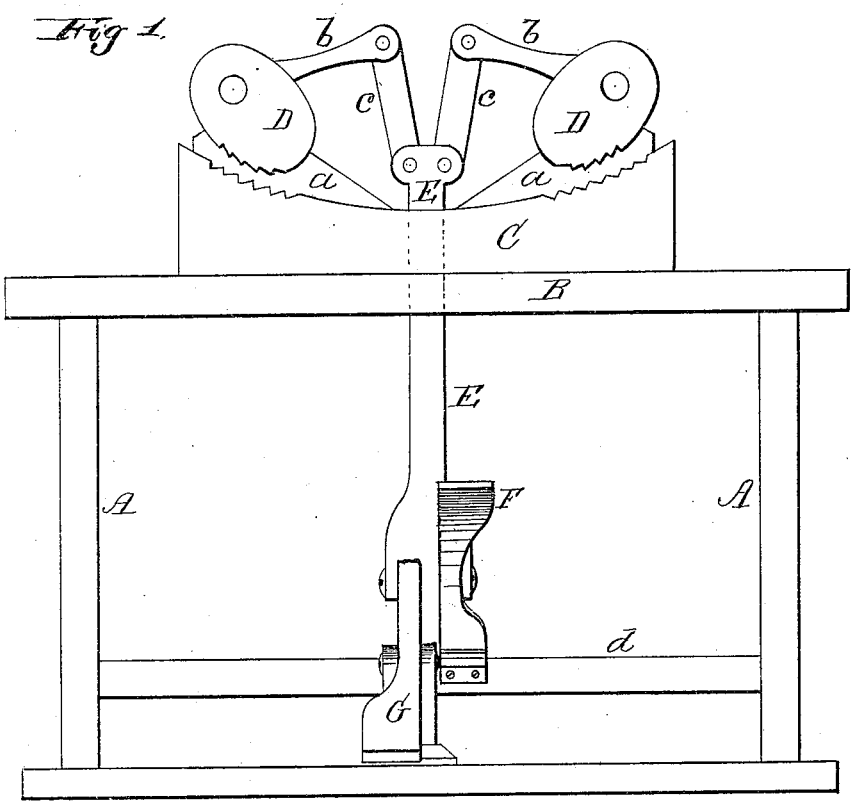
Figure 2:
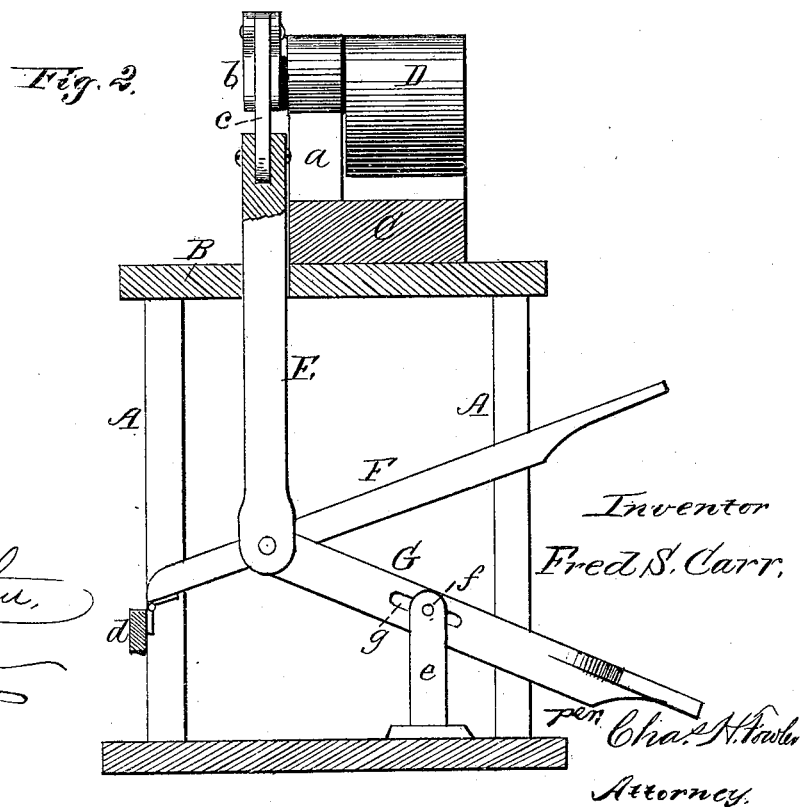

Figure 1 is a side elevation of my invention, and Fig. 2 is a cross-section of the same.

The present invention has reference to that class of tire-upsetters in which are employed serrated cams and serrated plates, between which the tire is passed, said cams being connected with suitable levers or mechanism, so as to cause the serrated faces of the cams and plates to bite the bar and hold it firmly between them.

The object of the invention is to connect these serrated cams with a system of levers and arms, which are in turn connected to foot-treadles, whereby the cams can be forced down upon the bar and instantaneously raised or elevated therefrom by the pressure of the foot upon the treadle, thereby insuring a more perfect operation of the device, and at the same time obtaining increased power. These objects I attain by the construction and arrangement of the levers, arms, and treadles substantially as shown in the drawings, and hereinafter described.

In the accompanying drawings, A represents the frame-work, of any suitable form and construction, which supports a table, B, having connected thereto a concave serrated bed, C, of cast-iron or other suitable metal. Above the bed C are bearings $a$ for the shafts of serrated cams D, between which and the bed C the bar or tire is placed after being heated. To the shafts of the cams D are connected arms $b$, and to the ends of these arms are pivoted the ends of links $c$, the opposite or lower ends of said links being pivoted to a vertical bar, E. This bar E passes down through an opening in the table B, and has pivoted to its lower end two foot-treadles, F G, the former having its outer end hinged to a cross-brace, $d$, of the frame A, while the treadle G is connected near its middle to a standard, $e$, by a pin, $f$, which passes through an elongated slot, $g$, which allows of the treadle G having the required sliding motion backward and forward when the treadles F G are operated alternately by the feet. When the treadle G is depressed it raises the bar E, and by its connections with the cams D, through the arms $b$ and links $c$, said cams are caused to be elevated and the heated tire or bar inserted between the serrated faces of the cams and bed C. After the tire or bar is thus placed in position the bar E is depressed by pressing with the foot upon the treadle F, which causes the serrated faces of the cams to be brought with great force upon the tire or bar, giving the tire no chance to slip, as the operator stands with the weight of his body on the treadle while the dent is hammered out of the tire to upset it.

The treadles F G and manner of connecting them to the cams D avoids the necessity of touching the machine with the hands, which is considered of great advantage in the process of upsetting the tire, as the operation of the cams in raising and lowering them is done much quicker and with greater effect.

Having now fully described my invention, what I claim as new, and desire to secure by Letters Patent, is—

In a tire-upsetter, the combination, with the serrated bed C and cams D, of the arms $b$, links $c$, bar E, and treadles F G, constructed and arranged to operate substantially as and for the purpose set forth.

In testimony that I claim the above I have hereunto subscribed my name in the presence of two witnesses.

FRED SUMNER CARR.

Witnesses:
S. P. SMITH,
R. E. CARR.